United States Patent [19]

Hirakushi

[11] Patent Number: 4,718,514
[45] Date of Patent: Jan. 12, 1988

[54] STEERING FORCE CONTROL DEVICE FOR POWER STEERING APPARATUS

[75] Inventor: Shuzo Hirakushi, Nara, Japan

[73] Assignee: Koyo Seiko Kabushiki Kaisha, Osaka, Japan

[21] Appl. No.: 905,635

[22] Filed: Sep. 9, 1986

[30] Foreign Application Priority Data

Sep. 9, 1985 [JP] Japan .................. 60-197804

[51] Int. Cl.$^4$ .............................................. B62D 5/08
[52] U.S. Cl. .................... 180/142; 180/133; 180/141
[58] Field of Search .................. 180/133, 141, 142

[56] References Cited

U.S. PATENT DOCUMENTS 4,189,024  2/1980  Jablonsky .................. 180/133
4,593,783  6/1986  Honaga .................... 180/141

Primary Examiner—David M. Mitchell
Assistant Examiner—Donn McGiehan
Attorney, Agent, or Firm—Bruce L. Adams; Van C. Wilks

[57] ABSTRACT

An apparatus for controlling a steering force of a vehicle which uses a power steering apparatus in which a driving shaft for a sub-pump for feeding pressure oil into a hydraulic pressure reaction chamber provided internally of a main valve and a main pump for supplying pressure oil for the power steering apparatus is made common to both said pumps to increase an discharge amount and hydraulic pressure of the sub-pump. When speed information and steering angle information of the vehicle are obtained, the hydraulic pressure fed to the hydraulic pressure reaction chamber is controlled by a throttle means subjected to numerical control by output signal of the controller which is provided with predetermined data according to the travelling state of the vehicle and the other throttle means by way of analog control wherein a variation of road resistance is sensitively transmitted as a variation of hydraulic pressure to vary an opening in response thereto, thus always obtaining a proper steering force. The controller further processes an engine revolution information in addition to the foregoing informations to thereby provide a fail-safe function for the steering force control device according to the present invention.

30 Claims, 10 Drawing Figures

STEERING FORCE CONTROL DEVICE FOR POWER STEERING APPARATUS

BACKGROUND OF THE INVENTION

The present invention relates to a device for controlling a steering force in a power steering apparatus provided with a hydraulic pressure reaction mechanism, and more specifically to a steering force control device for controlling the function of a power steering apparatus in response to the speed and steering angle of a vehicle.

It has been widely known, for example, from U.S. Pat. No. 4,034,825 entitled POWER ASSISTED VEHICLE STEERING issued on July 12, 1977 to Frederick John Adams, that a rotational torque from a steering wheel is increased by a power steering apparatus provided with a resilient torsion bar and then transmitted to a travelling wheel. In this patent, the operation of the power steering apparatus is controlled according to the speed of an automobile. More specifically, the aforesaid patent discloses that at the time of high speed drive, the operation of the power steering apparatus is weakened whereas at the time of low speed drive, the operation thereof is intensified. In the power steering apparatus as described above, for example, the rotation of the rotating shaft of the engine is transmitted to an oil pump by a pulley and an endless belt passed over the pulley, and oil within an oil tank is supplied by the oil pump to the power steering apparatus to strengthen the steering force. Furthermore, the rotation of a countershaft of a transmission of the vehicle is transmitted to a separate auxiliary oil pump, and oil from the oil tank is sucked into the auxiliary oil pump. A throttle valve is provided on a discharge port of the auxiliary oil pump. Oil having passed through the throttle valve is again returned to the oil tank, and pressurized oil is introduced from a middle portion between the discharge port of the auxiliary oil pump and the throttle valve into a hydraulic pressure reaction chamber for controlling the torsion of the torsion bar to control the operation of the power steering apparatus. More specifically, the auxiliary pump is driven to increase the number of revolutions thereof proportional to the vehicle speed as the countershaft of the transmission of the vehicle rotates rapidly, and the amount of discharge of the pump increases. Accordingly, at the time of high speed drive, high oil pressure is applied to the throttle valve, which results in application of the high pressure to the hydraulic pressure reaction chamber to weaken the operation of the power steering apparatus to render the operation of a steering wheel heavy. However, the dependence to the countershaft leads to a drawback that the amount of discharge of the auxiliary pump is too small to obtain a great hydraulic pressure reaction.

With respect to the characteristics of vehicle speed (V)—steering force (T), it has been assured from experiments that as shown in FIG. 7, at the low speed travelling of the vehicle, the steering force does not change so much; at the time of medium speed travelling of the vehicle, the force abruptly changes; at the high speed travelling of the vehicle, the force does not again change so much, which are preferable. It is not possible for a simple combination of a vehicle speed responsive pump and a fixed throttle valve as in the prior art to suitably obtain the desirable characteristic of vehicle speed (V)—steering force (T). Namely, it is impossible to suitably realize the characteristics of vehicle speed (V)—steering force (T) of various forms as shown in A, B and C of FIG. 9.

It has been further assured from experiments that even if the vehicle speed is the same, the value of the steering output (P) is varied according to a variation in steering angle as shown in the characteristic of steering angle ($\alpha$)—steering force (T) of FIG. 8, whereby the safety and maneuverability of the vehicle may be further enhanced. FIG. 8($a$) shows the ideal characteristic assured by the experiments and FIG. 8($b$) shows the prior art characteristic. However, such an ideal characteristic cannot be expected as far as the well-known hydraulic pressure control is used.

Moreover, in the auxiliary oil pump driven by the transmission of the vehicle, at the time of low speed rotation, namely, at the time of low speed travel of the vehicle, there exists a problem that the amount of discharge of the oil pump is insufficient, and pulsation and pressure variation occur.

Furthermore, in the control of the prior art structure, the condition of the road surface cannot be fed back as information to the control of steering force, and therefore even if there is less friction in road surface such as snow roads, road surfaces at rainy days, etc., variation in steering force as required is not transmitted to the operator, and in addition, even if the road surface is uneven, it is not transmitted as variation in steering force to the operator.

SUMMARY OF THE INVENTION

It is an object of the present invention to provide a steering force control device in a power steering apparatus for a vehicle in which pressurized oil supplied to a hydraulic pressure reaction chamber within a main valve of the steering force control device according to vehicle speed information and steering angle information obtained by detecting a speed (V) of a travelling vehicle and a steering angle ($\alpha$) of a steering wheel may be suitably controlled to always obtain an adequate steering force.

The present invention is intended to overcome the aforementioned technical problem by the provision of a stepping valve subjected to numerical control in accordance with information of a vehicle speed (V) and information of a steering angle ($\alpha$) and a pressure responsive valve adapted to be actuated under analog control by introducing therein hydraulic pressure which always transmits a variation of a frictional force between the road surface and the driving wheel as a variation of a reaction from the road surface to a hydraulic pressure cylinder of a power steering apparatus the pressure responsive valve being disposed, in a hydraulic circuit in communication with the hydraulic pressure reaction chamber.

For achieving the aforesaid object, according to the present invention, there is provided a power steering apparatus having a hydraulic pressure reaction chamber for controlling by hydraulic pressure a relative torsional angle between an input shaft and an output shaft, characterized in that there are provided a main pump and a sub-pump driven by the engine, pressurized oil from the main pump is introduced into a hydraulic cylinder of a power steering apparatus via a main valve, and another pressurized oil from the sub-pump is supplied to the hydraulic pressure reaction chamber. In an oil passage between the sub-pump and the hydraulic pressure reaction chamber a first throttle means is disposed and actuated by a pressure of a circuit from the main pump to the main valve and a second throttle means actuated by a stepping motor to form a construction in which oil is recirculated into a tank. The stepping motor is rotated and displaced by a pulse signal output from a controller having data arranged in a matrix form by a combination of a range of vehicle speed and a range of steering angle preset by use of signals of a vehicle speed sensor and a steering angle sensor, whereby an opening of the second throttle means is controlled and in the case where no vehicle speed signal is produced by the vehicle speed sensor despite the fact that the signal of revolutions of the engine indicates that the revolutions in excess of a predetermined value continues for more than a predetermined period of time, a preset pulse signal at the time of travelling at a high speed is generated; when a variation in signal of the steering angle is not produced by the steering angle sensor for a predetermined time, control according to the steering angle is not carried out or a pulse signal at the time of travelling at a preset high speed is generated in a similar manner as that described above; and when wiring of electric circuits is broken or control of the controller does not work properly, a current to the stepping motor is cut off so as to close the opening of the second throttle means thereby controlling the pressure acting on the reaction chamber.

The above and other objects and features of the present invention will be more understood from the reading of the following description in connection with the accompanying drawings which illustrate one embodiment.

DESCRIPTION OF THE PREFERRED EMBODIMENTS

Figure 1:
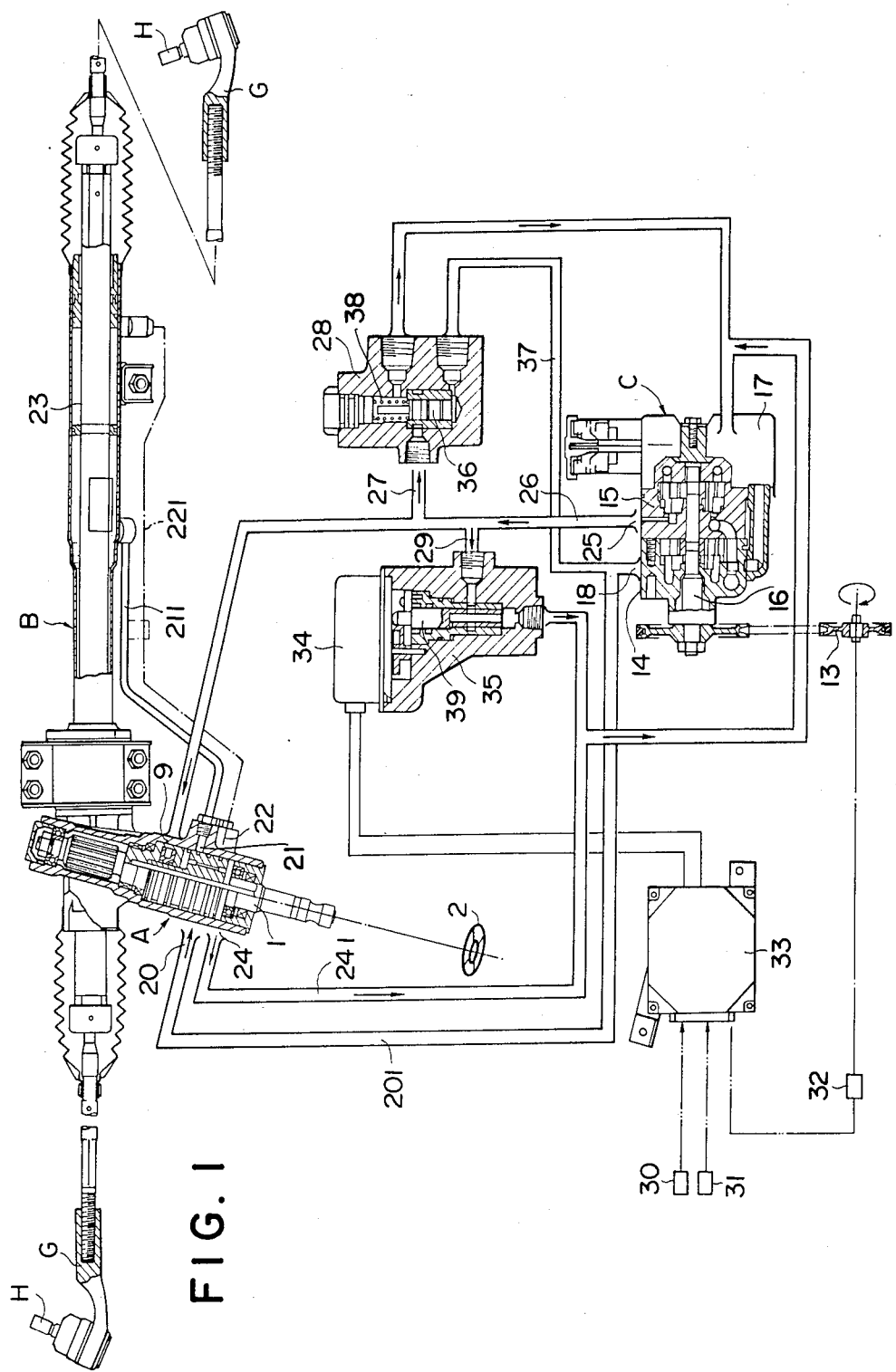
FIG. 1 diagrammatically illustrates constructions of various parts and an oil passage system with essential parts sectioned in one embodiment according to the present invention.
Figure 2:
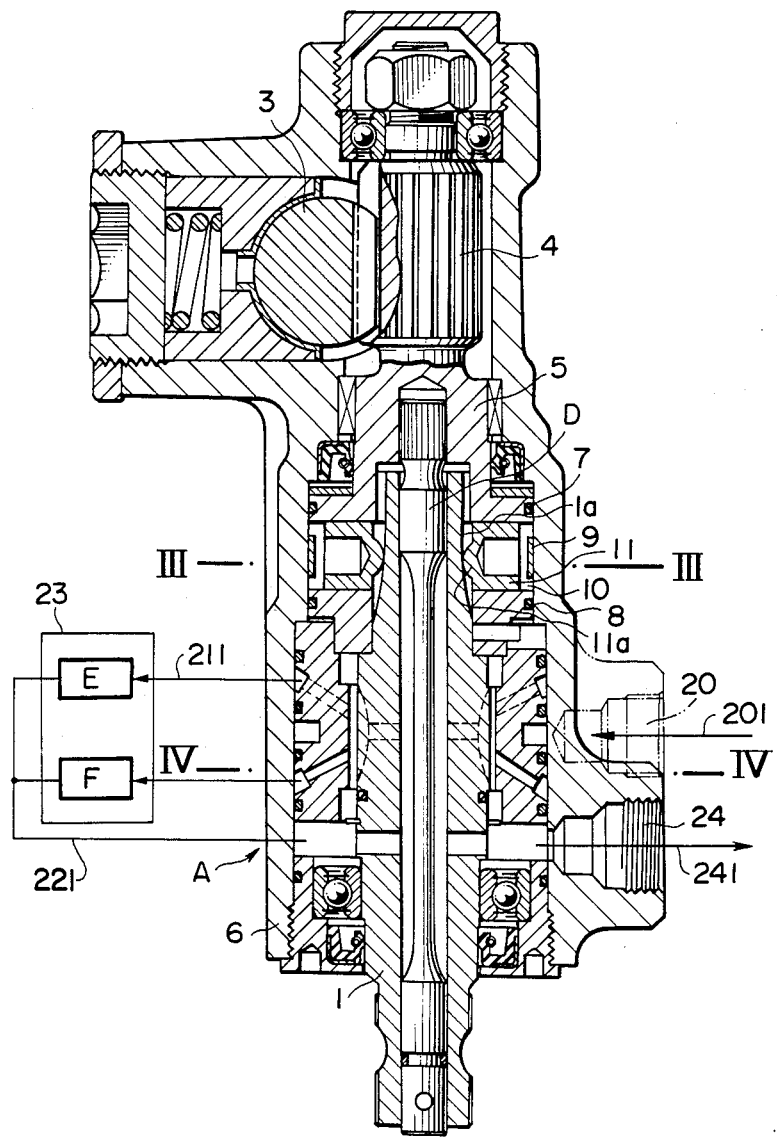
FIG. 2 is a sectional view of a main valve of FIG. 1.
Figure 3:
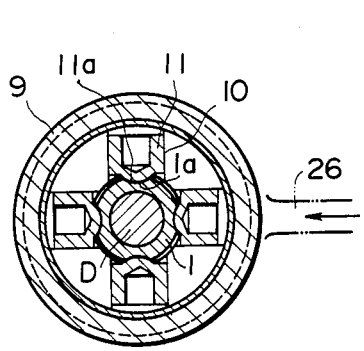
FIG. 3 is a sectional view taken along line III—III of FIG. 2.
Figure 4:
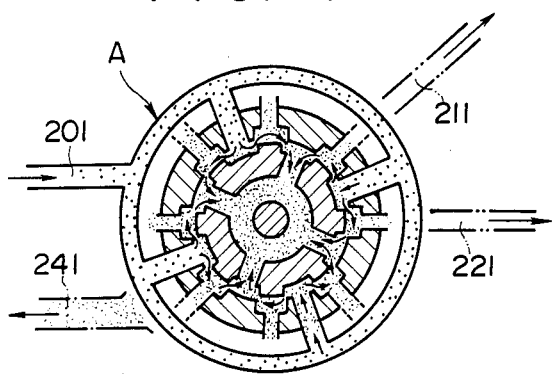
FIG. 4 is a sectional view taken on line IV—IV of FIG. 2.

Referring now to FIGS. 1 through 6, the embodiment shown therein will be described in detail. In these figures, a reference character A designates a main valve, B a power steering apparatus, C a two-throw pump operated by the engine, G a front axle and H a king pin. A reference numeral 1 designates an input shaft connected to a steering wheel 2, 3 a rack connected to and driven by the steering wheel, 4 a pinion meshed with the rack 3, and 5 a pinion shaft of the pinion 4, the pinion shaft being an output shaft (See FIGS. 1 and 2) connected to the power steering apparatus B. The pinion shaft 5 is formed with a hydraulic pressure reaction chamber 9 sealed from the inner surface of a housing 6 by O rings 7 and 8. Plungers 11 are respectively slidably fitted within four throughholes 10 bored radially from the central portion of the output shaft 5. A raised portion 11a at the end of the plunger 11 is pressed by pressurized oil supplied to the hydraulic pressure reaction chamber 9 against a V-groove 1a formed in the outer peripheral surface of the input shaft 1.

The reference character C designates the two-throw pump actuated by the engine 13, in which a main pump 14 and sub-pump 15 are formed so as to have a common rotational shaft 16. The discharge amount of the sub-pump 15 is set to be smaller than that of the main pump 14. A reference numeral 17 designates a tank for the two-throw pump C. The first pressurized fluid or oil from a discharge opening 18 of the main pump 14 is supplied through a first oil passage 201 to a port 20 of the main valve A, and thereafter supplied from ports 21 or 22 of the main valve A to left and right cylinder chambers E, F of a hydraulic cylinder 23 of the power steering apparatus B via a second oil passage 211 or a third oil passage 221 to actuate a piston (not shown) of the power steering apparatus B so as to assist in the steering. The first oil discharged from the cylinder chamber E or F is circulated to the port 22 or 21 of the main valve A via the third or second oil passage 221 or 211, and thereafter returned from a port 24 of the main valve to the tank 17 through a fourth oil passage 241. The second pressurized fluid or oil from a discharge opening 25 of the sub-pump 15 is supplied to the hydraulic pressure reaction chamber 9 via a fifth oil passage 26. The fifth oil passage 26 has two branch points halfway thereof. A first branch oil passage 27 is connected to one of the branch points to return the second oil to the tank 17 through a first control or throttle valve 28 controlled by a circuit pressure transmitted by a third branch oil passage 37 connected between the port 18 of the main pump 14 and the first control valve 28. A second oil passage 29 is connected to the other branch point to return the second oil to the tank 17 through a second control or throttle valve 35 whose throttle opening is varied according to a rotational angle of a stepping motor 34 which is actuated by a controller 33 provided with a microcomputer (hereinafter merely referred to as CPU) which, upon receiving signals from a vehicle speed sensor 30, a steering angle sensor 31 and an engine revolution sensor 32, selects a desired element among a group of elements arranged in a matrix-like form in which each element is shown as a square having an area $\Delta v \times \Delta \alpha$ in FIG. 6 according to the content of the aforesaid signals and releases a pulse signal based on a data distributed in advance to the aforesaid element. Besides, the controller 33 is provided with fail-safe means.

Figure 6:
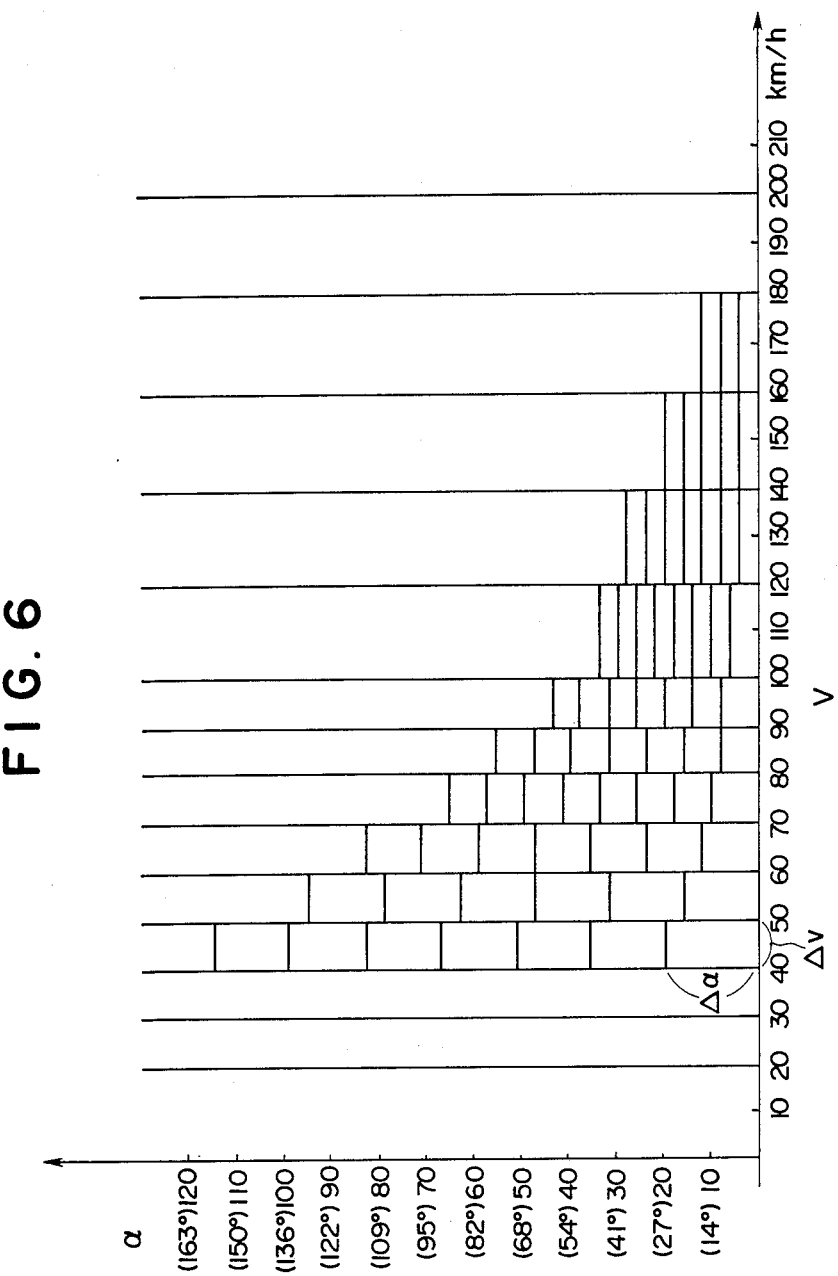
FIG. 6 is a memory map inputted in the controller.
Figure 7:
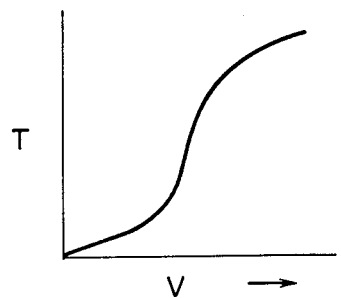
FIG. 7 is a graph showing the relation between the vehicle speed (V) and the steering force (T)
Figure 8:
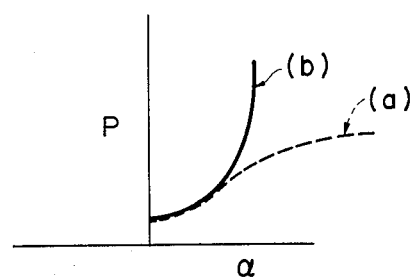
FIG. 8 is a graph showing the relation between the steering output (P) and the steering angle ($\alpha$)
Figure 9:
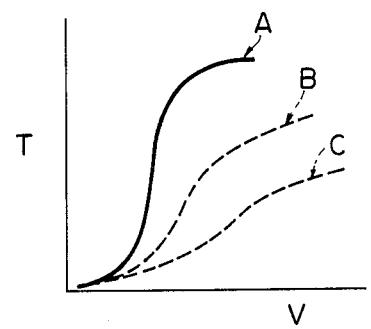
FIG. 9 is a graph showing various characteristics of the vehicle speed (V) and steering force (T)

In FIG. 6, $\Delta v$ and $\Delta \alpha$ are discrete amounts representative of the preset change in the vehicle speed and the set change in steering angle, respectively, which vary according to the magnitude of the speed v of the vehicle and the magnitude of the steering angle $\alpha$ and are not constant. The $\Delta v$ and $\Delta \alpha$ are determined corresponding to a certain range of the vehicle speed and a certain range of the steering angle to form a matrix of $\Delta v \times \Delta \alpha$ and the numeral to be indicated by every element of the matrix is predetermined. The signal of the vehicle speed enters as numeral information (for example, 4 pulse/r.p.m "7.07 hertz/10 km" from a lead switch mounted on the axle) into the controller 33. On the other hand, since information of the steering angle (α) is produced as the analog amount, it is converted into numeral information by an A/D convertor within the controller 33. One element of the Δv×Δα matrix is selected according to the input information of the input signal of the vehicle speed (V) and the steering angle (α) to apply a numeral signal determined in accordance with that selected element to the stepping motor to program control the same, and a control system thereof comprises an open loop.

A spool 36 is disposed in a internal pass age of the first control valve 28, the spool 36 having one end face being communicated with the third branch passage 37 from the discharge opening 18 of the main pump 14, and the circuit pressure from the main pump 14 is transmitted to the end face of the spool 36. The other end face of the spool 36 is pressed by means of a spring 38. The spool 36 is displaced till the circuit pressure and the spring force of the spring 38 are balanced due to the rise in the circuit pressure to vary an open area of the passage of the control valve 28, which serves as a throttle valve.

A rotary shaft 39 is arranged in the internal passage of the second control valve 35, and the open area thereof is varied by rotation of the stepping motor 34. The return function of the spiral spring is incorporated in the upper surface of the stepping motor 34 so that at the time of trouble of the controller 33, and trouble in wiring of the stepping motor 34, the opening of the second control valve 35 is automatically shifted to the opening in the state of the high speed travelling.

The fail-safe function of the controller 33 is such that when the vehicle speed sensor 30 is in trouble and fails to provide the vehicle speed signal despite the fact that there exists a signal indicative of the revolution of the engine in excess of a predetermined number of revolutions of the engine, CPU gives the judgement of abnormality to apply the number of pulses indicative of the high speed travelling to the stepping motor 34 whereby the stepping motor 34 is shifted to the rotational angular position in the high speed travelling state. Also, in the case where the steering angle sensor 31 is in trouble and the signal than the sensor 31 is not changed for more than a given time, CPU gives the judgement of abnormality to effect similar control to the stepping motor. Alternatively, the control according to the steering angle can be stopped and instead the control according to only the vehicle speed can be effected.

In the case of abnormality of CPU of the controller 33 and trouble such as burn-out of the stepping motor 34, a current flowing through the stepping motor 34 is cut off, and the motor shaft is driven by the force of a spring provided on the stepping motor 34 to cause the motor to shift to the rotational angular position in the high speed travelling state.

Figure 5:
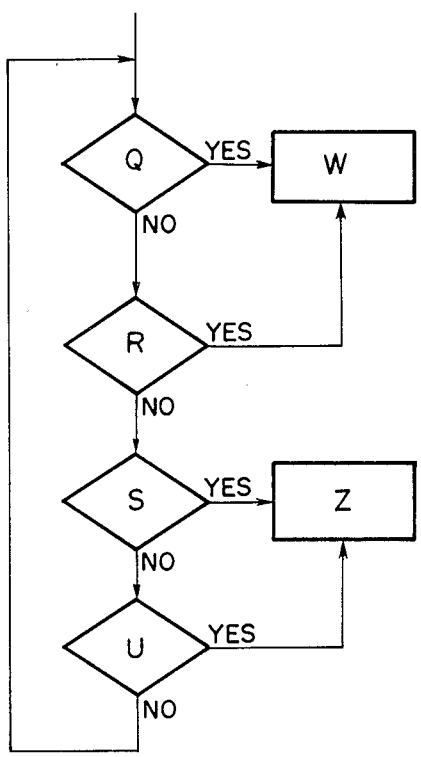
FIG. 5 illustrates the operation showing the failsafe function of the controller.

FIG. 5 is a flow chart showing the aforementioned fail-safe control logic.

Symbols used in FIG. 5 are as follows:
Q: Is vehicle speed sensor wrong?
R: Is steering angle sensor wrong?
S: Is wiring of the stepping motor wrong?
U: Is CPU wrong?
W: Shift the step motor to the high speed travelling state.
Z: Disconnect a power supply to the step motor.

By the fail-safe operation, the presence of abnormal condition of the CPU is checked when the controller 33 is turned ON, and if it has something wrong, a power supply to the stepping motor 34 is cut off. If no abnormal condition is present, burn-out check is made, and if there is something wrong, a power supply to the stepping motor 34 is likewise cut off. P The vehicle speed sensor 30 and the steering angle sensor 31 are checked after the actual travelling of the vehicle has been carried out, and if there is something wrong, the stepping motor 34 is shifted to the rotational angular position in the high speed travelling state, and the successive checks are conducted.

Figure 10:
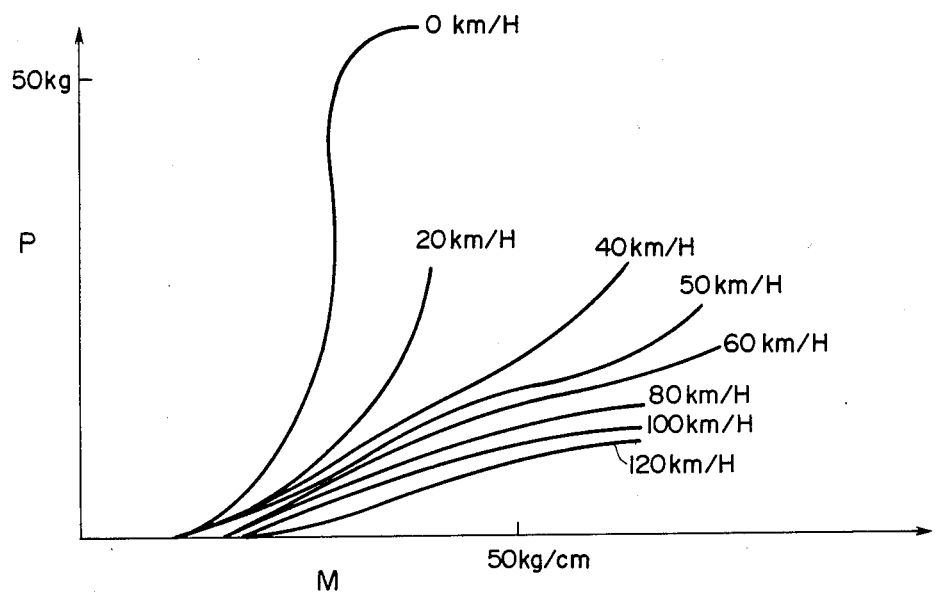
FIG. 10 is a showing the characteristics of the steering output (P) (reaction pressure) and the steering torque (M) obtained from the embodiment of the present invention.

Next, the operation of the device will be described. FIG. 10 shows the relationship between the steering output (P) (reaction pressure) and the steering torque (M) according to the present invention.

State where the vehicle speed is 0 or at an extremely low speed:

Since a signal from the vehicle speed sensor 30 is very small, a data signal from the controller 33 is also small, and the rotational angle of the stepping motor 34 is 0 or extremely small. Therefore, the second control valve 35 has a sufficient open area, and no throttle pressure is generated in the hydraulic pressure circuit. Accordingly, no pressure rise occurs in the hydraulic pressure reaction chamber 9, and the V-groove 1a of the input shaft 1 is in light sliding contact with the end of the raised portion 11a of the plunger 11 incorporated in the output shaft 5 and relative displacement between the input and output shafts is not restricted. Therefore, the power steering apparatus may exhibit a sufficient power assist force similar to the prior art structure.

Under that state when, the steering wheel is operated, the signal of the steering angle sensor 31 is transmitted to the controller 33. In this case, however, as can be understood from FIG. 6, when the vehicle speed is 0 km/sec. or extremely low, the output signal from the steering angle sensor 31 is ignored and the data signal is not fed from the controller 33. Thus, even if the steering angle is varied, the relative displacement between the V-groove 1a and the end of the raised portion 11a of the plunger 11 is not restricted. On the other hand, the hydraulic circuit pressure is increased by the operation of the power steering apparatus, and the first control valve 28 keeps the balance with the spring 38 and starts linear throttling.

Accordingly, under this condition, the hydraulic pressure acting on the hydraulic pressure reaction chamber 9 also rises as the hydraulic circuit pressure rises. However, the second control valve 35 is set to have a large throttle opening as compared with that of the first control valve 28 to ensure the state wherein even if the first control valve 28 is operated to be closed, the throttle pressure is not risen.

Therefore, even if the hydraulic circuit pressure is risen, the hydraulic pressure acting on the hydraulic pressure reaction chamber 9 is not risen and a sufficient power assist force is obtained similar to the prior art structure, thus rendering possible steering with a light steering torque.

State where the vehicle is travelling at medium speed:

The stepping motor 34 is further rotated than the state as previously mentioned through the controller 33 by the signal from the vehicle speed sensor 30 to reduce an open area of the second control valve 35. Because of this, the throttle pressure somewhat rises and the larger hydraulic pressure acts on the hydraulic reaction chamber 9. This hydraulic pressure produces engaging pressure to act on the V-groove 1a and the plunger 11 when the vehicle travels straight on whereby the rigid feeling in the vicinity of neutral of the steering wheel is enhanced, and the resistance or reaction torque increases when the steering wheel begins to be operated, resulting in a heavier steering torque than that of the steering wheel operation at a fixed state.

Under this state when the steering wheel is turned, the stepping motor 34 is further rotated to the angular position corresponding to the rotational angle of the steering wheel by the signal from the steering angle sensor 31. Thereby, the throttle pressure gradually increases according to the rotational angle of the steering wheel, and the heavier steering torque may be obtained as the steering wheel is turned. When the power assisting force is increased by the road resistance to increase the hydraulic circuit pressure, the first control valve 28 works. At that time, the open area of the second control valve 35 is smaller than that of the steering wheel operation at a neutral state, and therefore the throttle effect of the first control valve 28 is provided to obtain a response feeling or reaction torque according to the load. Namely, the response feeling of the steering wheel operation is sufficiently controlled by both of the throttle means 28 and 35 according to the steering angle and load, and the condition of the road surface may also be detected as a response feeling.

State where the vehicle is travelling at high speeds

When the stepping motor 34 is further rotated by the controller 33 according to the signal from the vehicle speed sensor 30, the open area of the control valve 35 is further reduced. Therefore, the throttle pressure further rises to increase the engaging pressure between the V-groove 1a and the plunger 11 and to reduce the relative torsional displacement between the input shaft 1 and the output shaft 5 to the minimum level to strongly couple the input and output shafts with each other, thus increasing the rigid feeling of the steering wheel when the vehicle travels straight on.

Under this condition, when the steering wheel is operated, the stepping motor is further rotated according to the signal from the steering angle sensor 31 to reduce the relative torsional displacement between the input shaft 1 and the output shaft 5, thus increasing the steering torque and lowering the power assisting force.

The power assisting force is rarely generated during the high speed travelling but the first control valve 28 is operated under the state where the second control valvue 35 is extremely throttled. Therefore, the function and effect of the control valve 28 increases so that a sufficient response feeling may be obtained in response to even a slight variation in the road resistance. Further, a discharge amount of the sub-pump 15 at the time of high speed travel can be small in order to increase the throttle pressure as described above.

The controller 33 has the function as shown in FIG. 5. When an abnormal condition occurs such as absence of detection signal due to the trouble of the vehicle speed sensor 30 and trouble of the steering angle sensor 31, the controller 33 judges the state of the vehicle travelling and shifts the second control valve 35 to the high speed travelling state, and at the time of abnormal conditions such as burn-out and short-circuit of wiring, wave trouble in CPU, etc., a power supply to the stepping motor 34 is cut off, and the stepping motor is automatically rotated to the rotational position in the high speed travelling state by the force of a spring set in the stepping motor. FIG. 5 is a flow chart showing the fail-safe program. For judgement of the vehicle travelling state, the number of revolutions of the engine is input in the controller 33. The data of the vehicle speed (V) and steering angle ($\alpha$) is input to and stored in the controller 33 so that, as shown in FIG. 6, the aforementioned matrix is divided in the map-like form and a single specific numeral is allotted to each domain or area of the matrix indicated by the variation of set speed ($\Delta V$)×the variation of set steering angle ($\Delta \alpha$). Necessary data is selected from these data according to the input signal from the vehicle speed sensor 30 and the input signal from the steering angle sensor 31, and the data is released by which the rotation of the stepping motor 34 is controlled.

The power steering apparatus according to the present invention has a hydraulic pressure reaction chamber for controlling in response to hydraulic pressure a relative torsional angle between an input shaft and an output shaft, wherein there are provided a main pump and a sub-pump driven by the engine. A pressurized oil from the main pump is introduced into a hydraulic cylinder of a power steering apparatus via a main valve, and another pressurized oil from the sub-pump is supplied to the hydraulic pressure reaction chamber. In an oil passage between the sub-pump and the hydraulic pressure reaction chamber, a first throttle means is provided and actuated by a pressure of a circuit from the main pump to the main valve and a second throttle means is also provided and actuated by a stepping motor to form a construction in which the oil is recicirculated into a tank, said stepping motor being rotated and displaced by a pulse signal output from a controller having data arranged in a matrix form by a combination of a preset range of the vehicle speed and a preset range of the steering angle upon receiving signals of a vehicle speed sensor and a steering angle sensor, whereby an opening of the second throttle means is a controlled. In case where no vehicle speed signal is present despite the fact that the signal of revolutions of the engine indicates that the revolutions of the engine in excess of a predetermined value continues for more than a predetermined period of time, a pulse signal at the time of travelling at a preset high speed is produced by the controller; when a variation in the signal of the steering angle is not present for a predetermined time, the control of the second control valve according to the steering angle is not carried out or a pulse signal at the time of travelling at a preset high speed is generated by the controller in a similar manner as that described above; when wiring of the stepping motor is broken or the control of the controller is not properly carried out, a current to the stepping motor is cut off so as to close the opening of the second control valve and the pressure acting on the reaction chamber is controlled. Therefore, the steering characteristic may be freely varied, a response feeling in response to even a minor road resistance may be obtained, the basic discharge amount of the sub-pump may be reduced to save energy, and the vehicle may be travelled safely even at the time of trouble in the steering angle sensor and the vehicle speed sensor, trouble in wiring, and abnormal CPU.

While the present invention has been described and illustrated by way of specific embodiments, it will be apparent to those skilled in the art that various modifications may be made to the invention without departing from the subject matter and scope thereof.

What is claimed is:

1. A steering force control device for a power steering apparatus, having a hydraulic pressure reaction chamber provided inside a main valve for controlling a relative torsional angle between an input shaft connected to a steering wheel and an output shaft connected to the power steering apparatus in response to a fluid pressure applied to the hydraulic pressure reaction chamber so as to apply a hydraulic reaction to the steering wheel, the steering force control device comprising:
- a main pump driven by an engine of a vehicle to feed a first pressurized fluid to said power steering apparatus through said main valve;
- a sub-pump driven by the engine of the vehicle to supply a second pressurized fluid separately from the first pressurized fluid to the hydraulic pressure reaction chamber within said main valve;
- a first oil passage connected between a discharge opening of said main pump and said main valve to transfer said first pressurized fluid from the main pump to the main valve;
- second and third oil passages for reciprocatingly transporting said first pressurized fluid between said main valve and said power steering apparatus to power-assist in driving the power steering apparatus;
- a fourth oil passage for circulating said first fluid, which has been transported from said power steering apparatus to said main valve, to a tank which receives said first fluid from said main valve;
- a fifth oil passage for supplying said second pressurized fluid from a discharge opening of said sub-pump to the hydraulic pressure reaction chamber within said main valve;
- first and second branch passages which are branched from said fifth oil passage to circulate said second fluid to said tank;
- first throttle means installed in said first branch passage and actuated by a hydraulic circuit pressure of the first pressurized fluid fed from said main pump to said main valve for controlling the pressure of said second fluid applied to the hydraulic pressure reaction chamber;
- a third branch passage connected between said first throttle means and the discharge opening of the main pump to transmit said hydraulic circuit pressure of the first pressurized fluid to said first throttle means; and
- second throttle means installed in said second branch passage and actuated in response to the speed of the vehicle and the steering angle thereof to control the pressure of said second fluid applied to the hydraulic pressure reaction chamber.

2. A device as set forth in claim 1; wherein said sub-pump and said main pump have a common driving shaft driven by the same engine.

3. A device as set forth in claim 1; including electric means for applying processed electric signals representative of the speed of the vehicle and the steering angle of the vehicle to the second throttle means to control the same.

4. A device as set forth in claim 2; including electric means for applying processed electric signals representative of the speed of the vehicle and the steering angle of the vehicle to the second throttle means to control the same.

5. A device as set forth in claim 3; wherein said electric means comprises a vehicle speed sensor, a steering angle sensor, a controller for processing electric signals fed from said sensors to produce the processed electric signals, and a stepping motor, the rotation amount of which is controlled by the controller to adjust a throttle amount of the second throttle means in response to the processed electric signals.

6. A device as set forth in claim 4; wherein said electric means comprises a vehicle speed sensor, a steering angle sensor, a controller for processing electric signals fed from said sensors to produce the processed electric signals, and a stepping motor, the rotation amount of which is controlled by the controller to adjust a throttle amount of the second throttle means in response to the processed electric signals.

7. A device as set forth in claim 5; wherein said stepping motor is rotated and displaced to control an opening of the second throttle means in response to the processed electric signal in the form of a pulse signal, and the controller includes producing means for producing the pulse signal determined on the basis of data arranged and stored in a matrix-like form by a combination of a certain range of the vehicle speed and a certain range of the steering angle preset in the controller upon reception of the signal from the vehicle speed sensor and the signal from the steering angle sensor.

8. A device as set forth in claim 6; wherein said stepping motor is rotated and displaced to control an opening of the second throttle means in response to the processed electric signal in the form of a pulse signal, and the controller includes producing means for producing the pulse signal determined on the basis of data arranged and stored in a matrix-like form by a combination of a certain range of the vehicle speed and a certain range of the steering angle preset in the controller upon reception of the signal from the vehicle speed sensor and the signal from the steering angle sensor.

9. A device as set forth in claim 7; wherein said electric means further comprises an engine revolution sensor and the controller includes first fail-safe means operative when the number of revolutions of the engine detected by the engine revolution sensor exceeds a predetermined value and the engine revolution continues for more than a predetermined time for producing a pulse signal indicating that the vehicle is travelling at a high speed even if the vehicle speed sensor fails to produce the electric signal and for producing another pulse signal if the steering angle sensor fails to produce the electric signal indicative of the variation of said steering angle for more than a predetermined period of time so as to stop the control of the second throttling means based on the steering angle, and second fail-safe means operative when the wiring of the stepping motor is broken or the controller fails to operate properly for cutting off current supply to said stepping motor so that the stepping motor is rotated to close the opening of said second throttle means in order to control the pressure of the second fluid acting on the hydraulic pressure reaction chamber.

10. A device as set forth in claim 8; wherein said electric means further comprises an engine revolution sensor and the controller includes first fail-safe means operative when the number of revolutions of the engine detected by the engine revolution sensor exceeds a predetermined value and the engine revolution continues for more than a predetermined time for producing a pulse signal indicating that the vehicle is travelling at a high speed even if the vehicle speed sensor fails to produce the electric signal and for producing another pulse signal if the steering angle sensor fails to produce the electric signal indicative of the variation of said steering angle for more than a predetermined period of time so as to stop the control of the second throttling means based on the steering angle, and second fail-safe means operative when the wiring of the stepping motor is broken or the controller fails to operate properly for cutting off current supply to said stepping motor so that the stepping motor is rotated to close the opening of said second throttle means in order to control the pressure of the second fluid acting on the hydraulic pressure reaction chamber.

11. A device as set forth in claim 7; wherein said electric means further comprises an engine revolution sensor and the controller includes first fail-safe means operative when the number of revolutions of the engine detected by the engine revolution sensor exceeds a predetermined value and the engine revolution continues for more than a predetermined time for producing a pulse signal indicating that the vehicle is travelling at a high speed even if the vehicle speed sensor fails to produce the electric signal and for producing another pulse signal indicating that the vehicle is travelling at a high speed if the steering angle sensor does not produce the electric signal indicative of the variation of said steering angle for more than a predetermined period of time, and second fail-safe means operative when the wiring of the stepping motor is broken or the controller fails to operate properly for cutting off current supply to said stepping motor so that the stepping motor is rotated to close the opening of the said second throttle means in order to control the pressure of the second fluid acting on the hydraulic pressure reaction chamber.

12. A device as set forth in claim 8; wherein said electric means further comprises an engine revolution sensor and the controller includes first fail-safe means operative when the number of revolutions of the engine detected by the engine revolution sensor exceeds a predetermined value and the engine revolution continues for more than a predetermined time for producing a pulse signal indicating that the vehicle is travelling at a high speed even if the vehicle speed sensor fails to produce the electric signal and for producing another pulse signal indicating that the vehicle is travelling at a high speed if the steering angle sensor does not produce the electric signal indicative of the variation of said steering angle for more than a predetermined period of time, and second fail-safe means operative when the wiring of the stepping motor is broken or the controller fails to operate properly for cutting off current supply to said stepping motor so that the stepping motor is rotated to close the opening of said second throttle means in order to control the pressure of the second fluid acting on the hydraulic pressure reaction chamber.

13. In a power steering system having a power steering apparatus driven to effect power-assisted steering of a vehicle in response to application of a pressurized fluid to the power steering apparatus: a main pump driven by an engine of the vehicle for producing a first pressurized fluid; a sub-pump driven by the engine for producing a second pressurized fluid independently of the first pressurized fluid; a housing; an output shaft rotatably supported in the housing and connected to the power steering apparatus to drive the same; an input shaft torsionally coupled to the output shaft in the housing and manually rotatively driven relative to the output shaft to transmit a torsional torque to the output shaft; valve means disposed in the housing for distributing the first pressurized fluid fed from the main pump to the power steering apparatus in accordance with the relative rotation between the input and output shafts so as to assist in driving the power steering apparatus; reaction means disposed in the housing for slideably coupling the input and output shafts with each other in response to the pressure of the second pressurized fluid fed from the sub-pump to the reaction means so as to transmit a reaction torque from the output shaft to the input shaft during the manual operation of the input shaft; and control means connected between the sub-pump and the reaction means for regulating the pressure of the second pressurized fluid in accordance with a vehicle operating condition.

14. A power steering system as set forth in claim 13; including a common drive shaft rotated by the engine for driving both the main pump and the sub-pump.

15. A power steering system as set forth in claim 13; wherein the sub-pump has a fluid discharge capacity smaller than that of the main pump.

16. A power steering system as set forth in claim 13; wherein the control means includes a first control valve for regulating the pressure of the second pressurized fluid in response to the pressure of the first pressurized fluid.

17. A power steering system as set forth in claim 16; wherein the first control valve includes means for increasing the pressure of the second pressurized fluid in response to an increase in the pressure of the first pressurized fluid indicative of the road surface condition so that the reaction means slideably couples the input and output shafts with each other according to the road surface condition.

18. A power steering system as set forth in claim 16; wherein the control means includes a second control valve for regulating the pressure of the second pressurized fluid in accordance with this travelling speed of the vehicle and the steering angle of the vehicle.

19. A power steering system as set forth in claim 16; wherein the second control valve has a regulation capacity larger than that of the first control valve.

20. A power steering system as set forth in claim 13; wherein the control means includes a second control valve for regulating the pressure of the second pressurized fluid in accordance with the travelling speed of the vehicle and the steering angle of the vehicle.

21. A power steering system as set forth in claim 20; wherein the second control valve comprises a throttle valve having a variable throttle opening effective to regulate the pressure of the second pressurized fluid.

22. A power steering system as set forth in claim 21; wherein the control means includes a stepping motor connected to the throttle valve for adjusting the variable throttle opening.

23. A power steering system as set forth in claim 22; wherein the control means includes a first sensor for detecting a vehicle speed, a second sensor to apply a control signal to the stepping motor so that the stepping motor is controlled to reduce the variable throttle opening when the vehicle speed and the steering angle increase to thereby increase the pressure of the second pressurized fluid.

24. A power steering system as set forth in claim 23; wherein the controller includes a matrix for converting a combination of the two putput signals into a corresponding control signal.

25. A power steering system as set forth in claim 23; wherein the control means includes a third sensor for detecting the rotational speed of the engine, and a first fail-safe means operative when the third sensor detects that the engine rotates at more than a predetermined speed for more than a predetermined interval for applying a control signal to the stepping motor effective to close the throttle opening if the first sensor fails to produce the output signal thereof.

26. A power steering system as set forth in claim 23; wherein the control means includes a third sensor for detecting the rotational speed of the engine, and a second fail-safe means operative when the third sensor detects that the engine rotates at more than a predetermined speed for more than a predetermined interval for applying a control signal to the stepping motor effective to close the throttle opening if the second sensor fails to produce the output signal thereof.

27. A power steering system as set forth in claim 23; wherein the control means includes a third sensor for detecting the rotational speed of the engine, and a third fail-safe means operative when the third sensor detects that the engine rotates at more than a predetermined speed for more than a predetermined interval for applying to the stepping motor a control signal in accordance with only the output signal from the first sensor if the second sensor fails to produce the output signal thereof.

28. A power steering system as set forth in claim 23; wherein the control means includes a fourth fail-safe means operative when wiring of the stepping motor is broken for cutting off a power supply thereto.

29. A power steering system as set forth in claim 23; wherein the control means includes a fifth fail-safe means operative when the controller fails to work properly for cutting off a power supply to the stepping motor.

30. A power steering system as set forth in claim 13; wherein the power steering apparatus includes an hydraulic cylinder operated by the first presurrized fluid to power-assist in steering of the vehicle.

* * * * *